United States Patent
Koizumi

(10) Patent No.: US 7,197,174 B1
(45) Date of Patent: Mar. 27, 2007

(54) MAGNETIC INK ENCODING PEN

(75) Inventor: David H. Koizumi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/396,407

(22) Filed: Sep. 15, 1999

(51) Int. Cl.
  *G06K 9/00* (2006.01)
(52) U.S. Cl. .................. 382/139; 382/314; 382/320
(58) Field of Classification Search ............... 382/100, 382/135, 181, 139, 188, 311, 207, 320, 115–123, 382/314; 235/449, 474, 379; 345/745, 179, 345/182, 183; 178/19.01, 19.05; 401/194; 250/221
See application file for complete search history.

(56) References Cited

U.S. PATENT DOCUMENTS

| | | | |
|---|---|---|---|
| 3,376,551 A * | 4/1968 | Armbruster ................. 382/188 |
| 3,566,045 A * | 2/1971 | Paine et al. ................. 360/122 |
| 3,700,828 A * | 10/1972 | Zacaroli ..................... 360/128 |
| 3,819,857 A * | 6/1974 | Inokuchi ...................... 178/19 |
| 4,087,789 A * | 5/1978 | Beery ......................... 382/320 |
| 4,369,431 A * | 1/1983 | Howbrook ................... 382/123 |
| 4,430,014 A | 2/1984 | Tsai ............................ 401/216 |
| 4,797,938 A | 1/1989 | Will .............................. 382/7 |
| 4,922,086 A * | 5/1990 | Milford ....................... 235/449 |
| 5,215,397 A * | 6/1993 | Taguchi et al. ............. 401/194 |
| 5,520,473 A | 5/1996 | Durham ....................... 401/216 |
| 5,546,538 A * | 8/1996 | Cobbly et al. .......... 395/200.01 |
| 5,563,401 A * | 10/1996 | Lemelson ................... 235/494 |
| 5,577,135 A | 11/1996 | Grajski et al. .............. 382/253 |
| 5,600,781 A * | 2/1997 | Root et al. .................. 395/326 |
| 5,667,924 A | 9/1997 | Ziolo ........................... 430/39 |
| 5,712,564 A * | 1/1998 | Hayosh ....................... 324/210 |
| 5,729,621 A | 3/1998 | Marshall et al. ............ 382/139 |
| 5,734,129 A | 3/1998 | Belville et al. ............... 178/18 |
| 5,768,417 A | 6/1998 | Errico et al. ................ 382/186 |
| 5,825,923 A | 10/1998 | Thompson et al. ......... 382/204 |
| 6,715,679 B1 * | 4/2004 | Infosino ..................... 235/449 |

OTHER PUBLICATIONS

Shimoma, Wataru, Magnetic Ink Recorder, Dec. 14, 1981, p. 1.*
Parascript, An Overview of Natural Handwriting Recognition, Printed Jun. 16, 1999, Internet, Available: http://www.parascript.com, pp. 1-6.
Press Release, Vadem Introduces PenOffice™ 1.1 for Microsoft® Windows®, Apr. 15, 1999, Vadem Media Relations, Internet, Available: http://www.paragraph.com, pp. 1-2.
Slate Corporation et al., JOT—A Specification for an Ink Storage and Interchange Format, htt://ontolingua.nici.kun.nl/jot.html, potential publication date—Mar. 14, 1996.

* cited by examiner

*Primary Examiner*—Matthew C. Bella
*Assistant Examiner*—Tom Y. Lu
(74) *Attorney, Agent, or Firm*—Kenyon & Kenyon LLP

(57) ABSTRACT

In one embodiment, an information signal is stored in magnetic ink. In another embodiment, a magnetic ink encoding stylus includes a magnetic ink write head. In a further embodiment, a computer system includes a magnetic ink encoding stylus coupled to a computer via an external bus.

24 Claims, 7 Drawing Sheets

FIG. 9
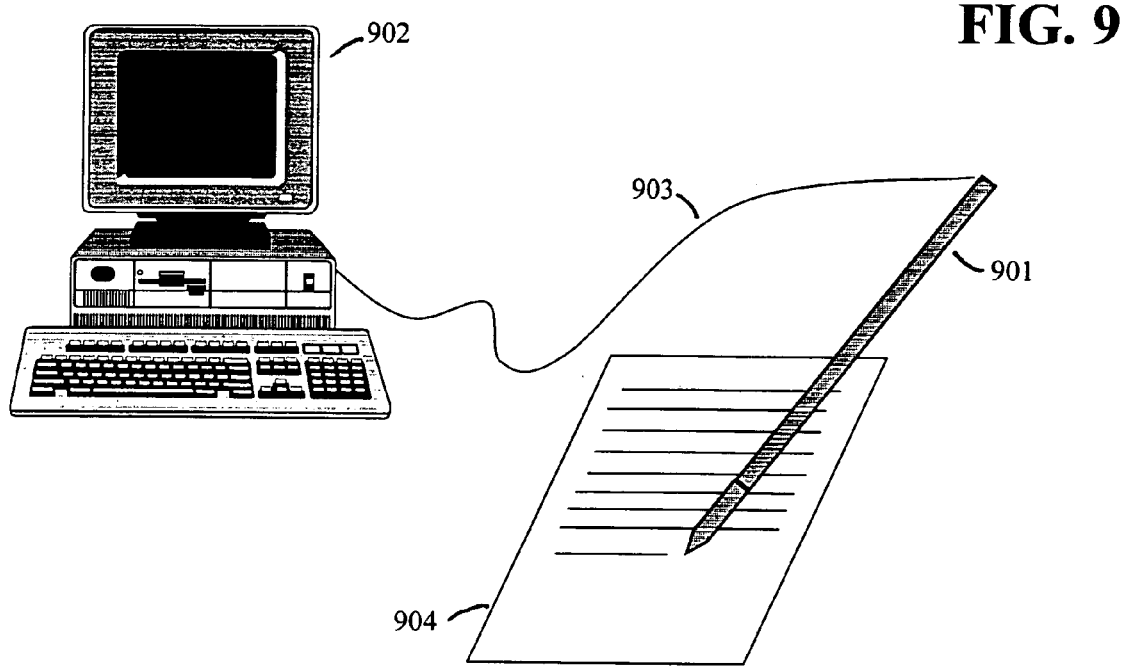
FIG. 10
01001001    01101110    01110100    01100101    01101100
FIG. 11
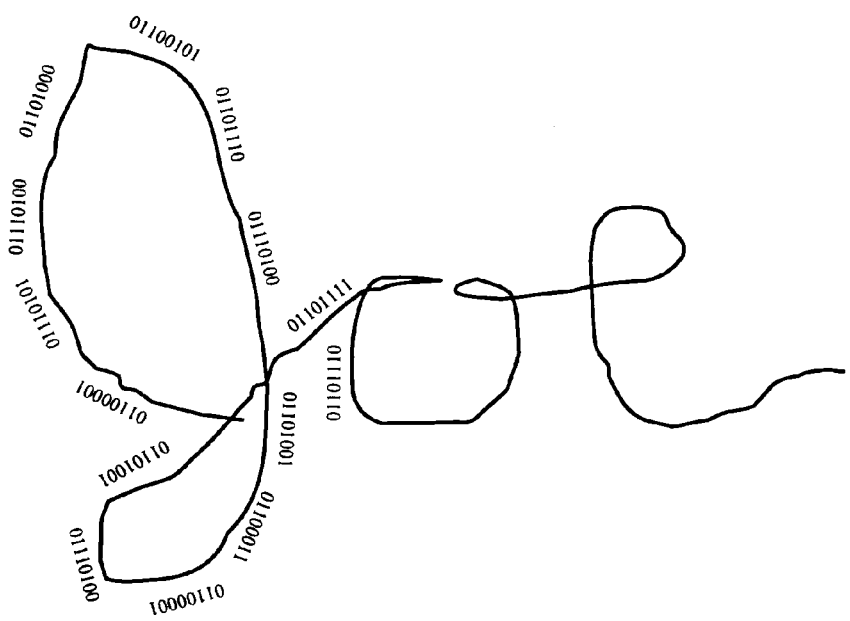

US 7,197,174 B1

MAGNETIC INK ENCODING PEN

FIELD OF THE INVENTION

The present invention provides an apparatus and method for information storage. More particularly, an information signal is stored in magnetic ink applied to a surface.

BACKGROUND OF THE INVENTION

Systems are known that print characters in magnetic ink, and those magnetic ink characters can subsequently be recognized by magnetic ink character recognition ("MICR") systems. Magnetic ink is an ink that contains particles of a magnetic substance, the presence of which can be detected by a magnetic sensor (e.g., a magnetic read head). MICR characters are preprinted in magnetic ink along the bottom edge of a check to identify the bank routing number, account number, and check number of the check. After a first bank receives a check written for a specific amount (e.g., the check is deposited at the first bank), the amount of the check is also printed in magnetic ink characters along the bottom edge of a check during bank industry processing of the check.

To enable MICR systems to recognize magnetic ink characters, the magnetic ink characters are printed in standardized fonts, such as a font known as E13B used in processing checks in the United States. When a magnetic ink character is scanned by a magnetic read head of a MICR system, a voltage proportional to the amount of flux sensed by the read head is produced. FIG. 2 of U.S. Pat. No. 4,797,938 to Will, issued Jan. 10, 1989, shows electrical signals generated as a MICR magnetic read head scans E13B magnetic ink characters. The electrical waveform for each magnetic ink character is based on the distribution of magnetic ink within each magnetic ink character read area (e.g., the sixty-three block area of each E13B magnetic ink character of FIG. 2 of U.S. Pat. No. 4,797,938). Characteristics of the waveform are compared to waveform characteristics stored in a memory to recognize the scanned character.

Known MICR character printing systems do not advantageously store an information signal in the magnetic ink of printed magnetic characters. Information, such as authentication data, authorization data, or other data, cannot be read from the printed ink that is stored in the magnetic ink. Instead, as taught by U.S. Pat. No. 5,712,564 to Hayosh, the magnetic particles in the magnetic ink are typically exposed to a magnetic field to orientate the dipoles of the magnetic particles of a document so that all magnetic vectors lie in the same direction.

FIG. 1 is an illustration of a prior art character printed in magnetic ink upon a paper check. Character 100 is printed in magnetic ink and was exposed to a uniform magnetic field. Each of the magnetic vectors in the magnetic ink of character 100 are aligned in the same direction.

Known systems for printing in magnetic ink do not adequately exploit the possibilities for storing information in magnetic ink.

SUMMARY OF THE INVENTION

Embodiments of the present invention provide a method and apparatus for storing an information signal in magnetic ink.

BRIEF DESCRIPTION OF THE DRAWINGS

FIG. 9 shows a computer system including an embodiment of a magnetic ink encoding pen that receives data from a computer and encodes the data into magnetic ink applied to a surface.

FIG. 10 is an illustration of data stored in the magnetic ink of a straight line drawn by a magnetic ink encoding pen on a piece of paper.

FIG. 11 is an illustration of authentication data encoded into a signature written with a magnetic ink encoding pen.

DETAILED DESCRIPTION

Embodiments of methods and apparatus for storing an information signal in magnetic ink are described. In the following description, for purposes of explanation, numerous specific details are set forth to provide a thorough understanding of the present invention. It will be obvious, however, to one skilled in the art that the present invention may be practiced without these specific details. In other instances, well known structures and devices are shown in block diagram form. Furthermore, it is readily apparent to one skilled in the art that the specific sequences in which steps are presented and performed are illustrative and it is contemplated that the sequences can be varied and still remain within the spirit and scope of the present invention.

Figure 1:
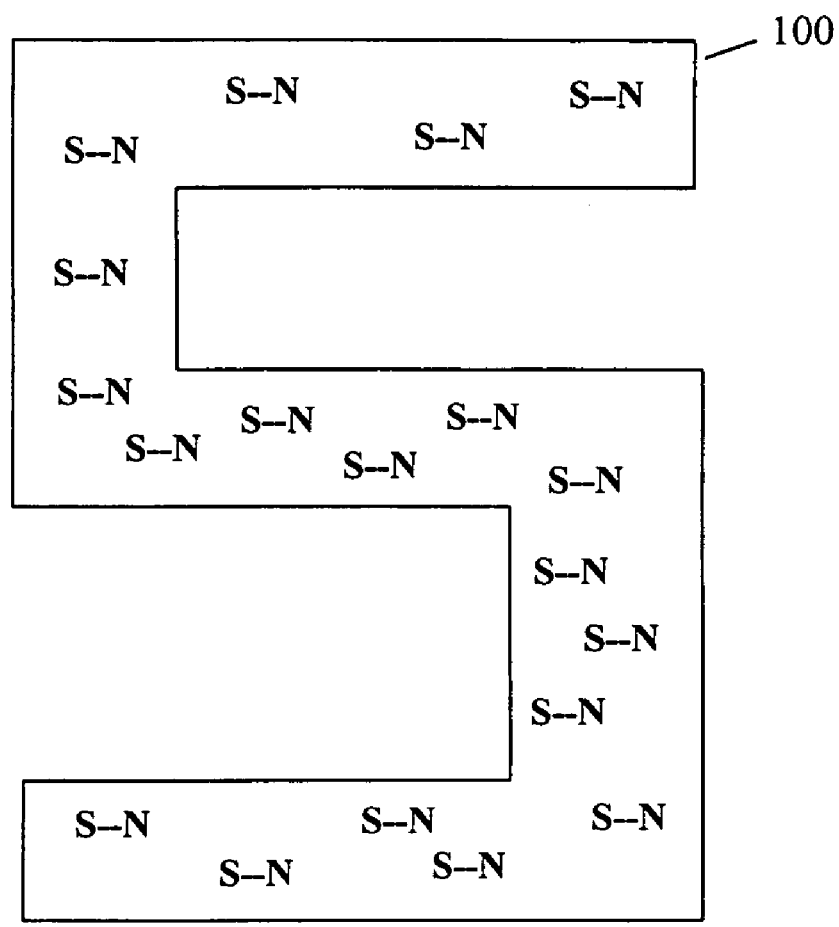
FIG. 1 is an illustration of a prior art character printed in magnetic ink upon a paper check.
Figure 2:
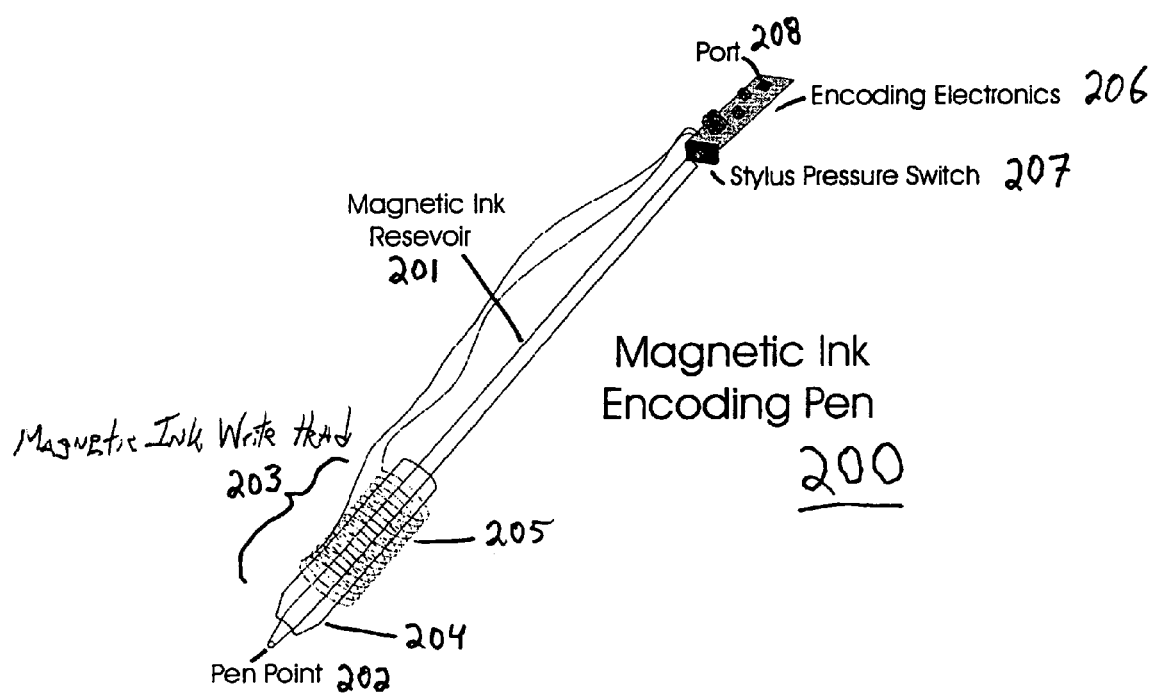
FIG. 2 shows a magnetic ink encoding pen in accordance with an embodiment of the present invention.

FIG. 2 shows a magnetic ink encoding pen ("magnetic pen") 200 in accordance with an embodiment of the present invention. Magnetic pen 200 includes a magnetic ink reservoir 201 coupled to a penpoint 202. The term "coupled" means connected directly or indirectly. The penpoint 202 can be a ballpoint, a rollerball, a felt tip, a marker tip, a nib of a fountain pen, etc. The magnetic ink reservoir 201 supplies magnetic ink to penpoint 202, which applies magnetic ink to a surface when a user writes on the surface with the magnetic pen 200. The magnetic ink reservoir 201 may be, for example, an extended tubular shaft, as is conventionally used in ballpoint pens. In another embodiment, the magnetic ink reservoir can be a cartridge, pouch, or other storage element coupled to a shaft or other structural element of a stylus (e.g., a pen).

A magnetic ink write head 203 is coupled to the magnetic ink reservoir 201. Magnetic write head technology is well known in the art. In one embodiment, and as illustrated in FIG. 2, the magnetic ink write head 203 is positioned behind the penpoint 202 and includes a magnetic shield (not separately shown in FIG. 2), a magnetic field director 204, and a magnetic field generator 205 The magnetic shield can be composed of mu-metal and encases the magnetic field director 204 and magnetic filed generator 205 to prevent undesired leakage of magnetic flux. In one embodiment, the magnetic shield includes an opening through which the penpoint 202 and a time-varying magnetic field can pass. The magnetic field director 204 is, for example, a tube-shaped magnetically permeable material (e.g., iron, steel, permalloy, a ferromagnetic material, etc.). In the illustrated embodiment, the magnetic ink reservoir 201 passes through the hollow of the tube. The magnetic field director 204 focuses a magnetic field generated by the magnetic field generator 205 in the proximity of the penpoint 202. The magnetic field generator 205 can be a magnetic coil (e.g., a copper wire coil, a coil of copper-trace printed membrane, etc.) that carries a time-variable electrical signal, to be described below, to generate a time-variable magnetic field.

A magnetic ink write head 203 including a magnetic coil surrounding a magnetically permeable core can provide a magnetic field in the proximity of the penpoint 202 that has the same modulation independent of the orientation of the pen about its central axis. As the magnetic ink is deposited onto a surface by the penpoint 202, the magnetic ink is exposed to the time-varying magnetic field generated by the magnetic ink write head 203. The varying magnetic field created by the magnetic ink write head 203 interacts with the magnetic particles of the deposited magnetic ink to write a magnetic signal into the magnetic ink.

Figure 3A:
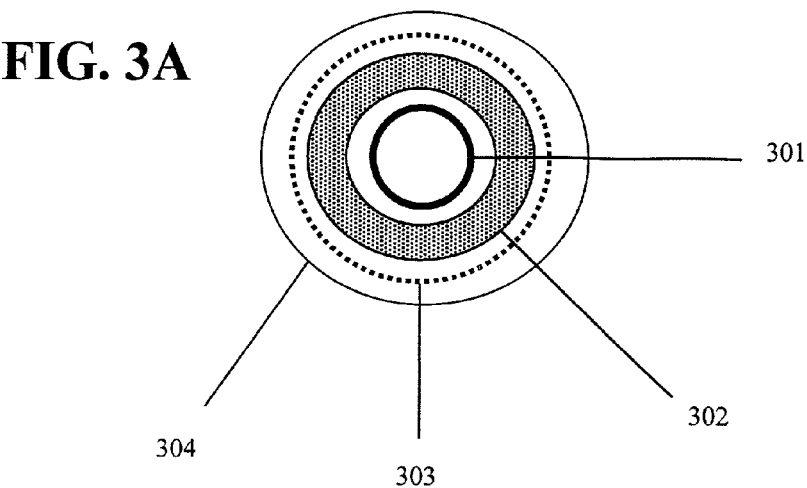
FIG. 3A illustrates a cross-sectional viewpoint of a magnetic ink encoding pen in accordance with an embodiment of the present invention.

FIG. 3A illustrates a cross-sectional viewpoint of a magnetic ink encoding pen in accordance with an embodiment of the present invention. Magnetic ink reservoir 301 is a tubular shaft. Surrounding the magnetic ink reservoir 301 is a iron magnetic core 302 that is tubular in shape. A copper wire coil 303 is wrapped around a portion of the iron magnetic core 302 and generates a magnetic field corresponding to an electrical signal carried by the copper wire of copper wire coil 303. A mu-metal magnetic shield 304 encases the magnetic ink write head to prevent undesired leakage of the generated magnetic field.

Figure 3B:
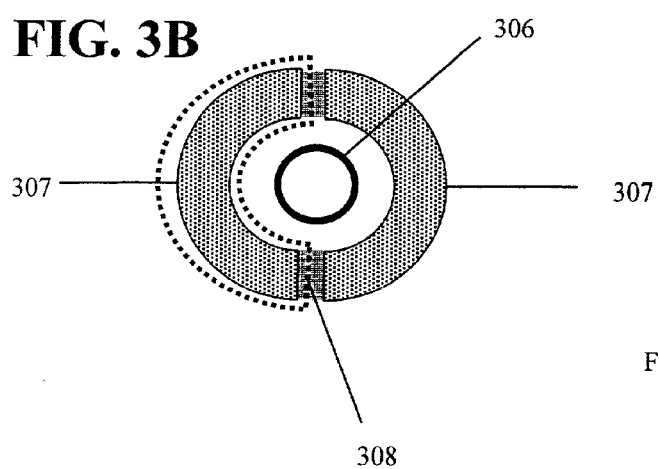
FIG. 3B shows a cross-sectional viewpoint of a section of an embodiment of a magnetic ink encoding pen.
Figure 3C:
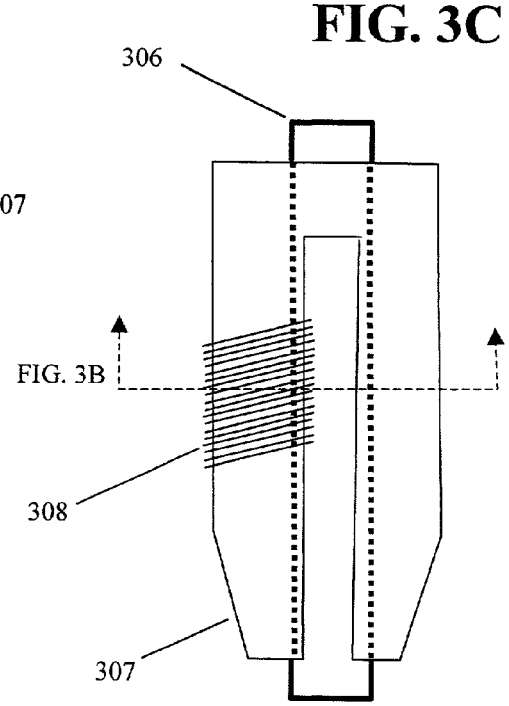
FIG. 3C shows a top view of the section of the magnetic ink encoding pen illustrated in FIG. 3B.

FIG. 3B shows a cross-sectional viewpoint of a section of another embodiment of a magnetic ink encoding pen. A magnetic ink cartridge 306 is surrounded by an iron core element 307 which includes two C-shaped prongs that protrude from a hollow disc. The magnetic ink cartridge runs through the hollow of the disc and between the C-shaped prongs. A wire coil 308 is wrapped around one of the C-shaped prongs. FIG. 3C shows a top view of the section of the embodiment of the magnetic ink encoding pen illustrated in FIG. 3B.

Figure 3D:
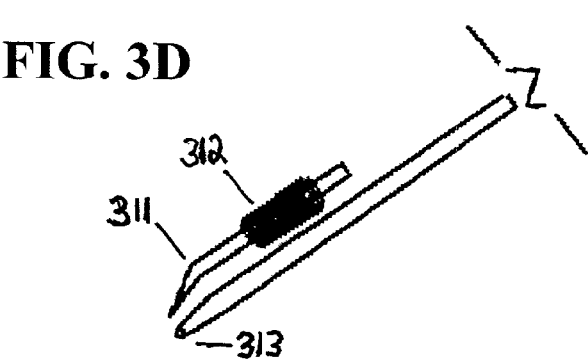
FIG. 3D shows another magnetic ink write head in accordance with an embodiment of the present invention.

In another embodiment of the present invention, a magnetic ink write head includes a plurality of magnetic pole faces, such as a north pole face and a south pole face, which can establish a time-varying magnetic field. In another embodiment, a magnetic ink write head includes three or more magnetic pole faces, and the magnetic polarity of each pole face is varied over time to produce a time-varying magnetic field. FIG. 3D shows another magnetic ink write head in accordance with an embodiment of the present invention. A magnetic ink write head is positioned behind the nib 313 of a fountain pen and includes an iron pin 311 as an iron core element, around which is wrapped a copper wire 312.

Referring again to FIG. 2, lead wires couple the magnetic ink write head 203 and encoding electronics 206. The encoding electronics 206 draw power from an external computer bus via port 208 and generate an electrical signal that is fed to the magnetic ink write head 203. In one embodiment, the electrical signal includes an information signal. The information signal can include pen stroke timing data such as a cyclical timecode, digital time data, an analog sawtooth signal, etc. In another embodiment, the information signal includes pen stroke direction data indicative of the direction the pen is writing. In one embodiment, the electrical signal includes a standard bias signal, which can be between 20 kHz and 100 kHz, and a cyclical timing signal that varies from 3 kHz to 7 kHz. Selection of a particular frequency as the bias signal and the range of frequencies of the timing signal can be based on the characteristics of the magnetic ink, such as the viscosity of the magnetic ink, the composition of the ink, the type of magnetic particles present in the ink, etc.

The encoding electronics 206 can include a stylus pressure switch coupled to the penpoint 202, e.g., by the shaft of the magnetic ink reservoir 201. The stylus pressure switch outputs a control signal (e.g., a pulse, a logical 1, etc.) responsive to pressure applied to the penpoint, e.g., when a user starts drawing a character, character segment, line, etc. The control signal initiates the generation of an information signal which is amplified and fed to the magnetic ink write head 203 to generate a time-varying magnetic field corresponding to the information signal. As the magnetic pen 200 writes a character by applying magnetic ink to a piece of paper, the time-varying magnetic field records in the magnetic ink a signal corresponding to the information signal.

Figure 4:
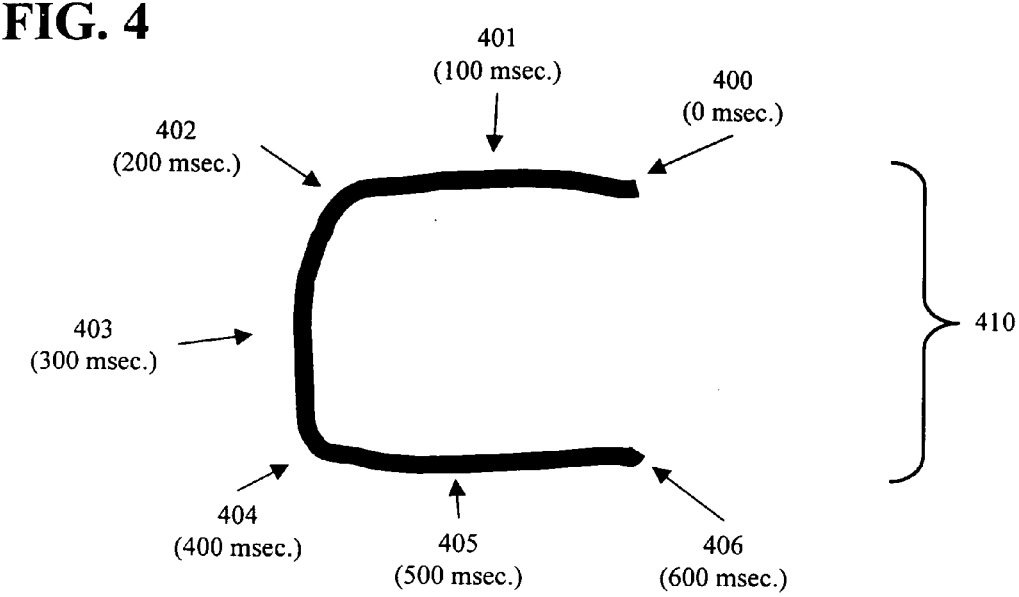
FIG. 4 shows a pen stroke of a letter "c" written in magnetic ink.

FIG. 4 shows a pen stroke of a letter "c" 410 written in magnetic ink, the pen stroke including points 400–406. The letter "c" 410 is illustrated as drawn in 600 milliseconds ("msecs."), beginning at point 400 at 0 msecs., drawn through points 401–405 (at 100 to 500 msecs.), and ending at point 406 at 600 msecs. In accordance with an embodiment of the present invention, dynamic pen stroke data can be encoded into handwriting that is written with a magnetic ink encoding pen. Handwriting recognition technologies advantageously allow the conversion of handwriting into computer text files that can be stored, searched and retrieved for archival, data-processing, and other purposes. One known type of handwriting recognition makes use of dynamic pen stroke data to facilitate the interpretation of the lines and curves of handwriting. Examples of such pen stroke data for a character, character segment, and/or cursive word include the start point, stop point, intermediate point(s), direction of writing, etc.

Letter "c" 410 includes a start point 400, intermediate points 401–405, and a stop point 406. Direction of writing data for letter "c" 410 includes data that the pen stroke moved left from the start point 401 to intermediate point 402, then moved down to intermediate point 404, and then moved right to the stop point 406. Dynamic pen stroke data can be utilized by computing devices and applications, such as Windows®-based computing devices and applications, to generate ASCII (American Standard Code for Information Interchange) text corresponding to the pen stroke data.

An application named Calligrapher®, sold by Para-Graph®, uses pen stroke data to recognize both cursive and block handwriting for Windows®-based, pen-enabled computing devices. See <http://www.paragraph.com/press_releases/penoffice11.html>, visited Jun. 16, 1999. A user of a pen stroke handwriting recognition application can handwrite with a computer mouse, on a computer graphics tablet, on a touch-screen, with a computer pen and pad device, etc. such that pen stroke data is generated and captured as the user writes. The dynamic pen stroke data, such as pen stroke timing and direction data, can be stored and recognized at a later time.

Figure 5:
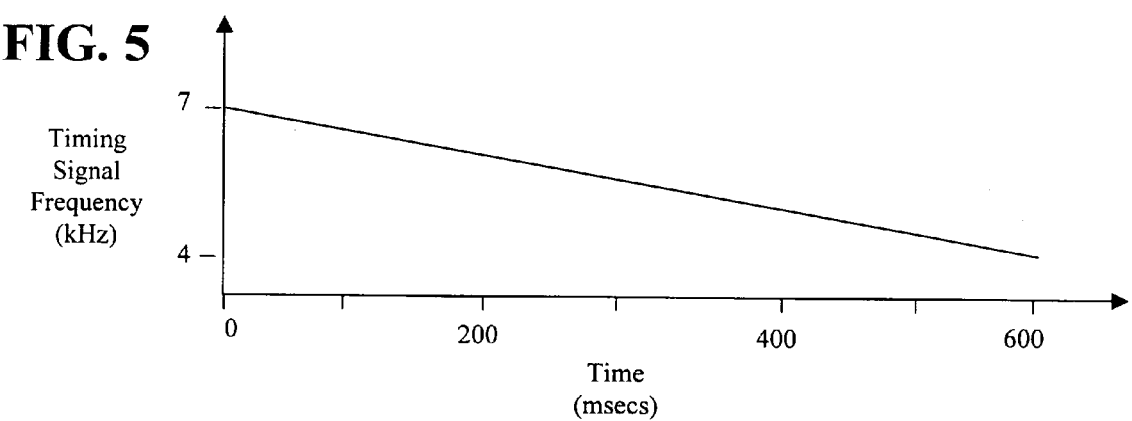
FIG. 5 illustrates a timing signal generated as a character is written in accordance with an embodiment of the present invention.

FIG. 5 illustrates a timing signal generated as a character is written in accordance with an embodiment of the present invention. The frequency of the timing signal can be generated to decrease at the rate of 0.5 kHz per 100 milliseconds and cause a corresponding magnetic timing signal to be stored in the magnetic ink of the character being written, such as letter "c" 410. When the magnetic pen is put to paper (e.g., at point 400 of the letter "c" 410) the pressure switch 207 senses the applied pressure and outputs a control signal, which initiates generation of the timing signal of FIG. 5. The timing signal initially has a frequency of 7 kHz at zero msecs. As the letter "c" 410 is written in magnetic ink, the timing signal frequency decreases at the rate of 0.5 kHz per 100 milliseconds. The time-varying timing signal generates a corresponding time-varying magnetic field, which writes a corresponding time-varying magnetic timing signal into the magnetic ink. In another embodiment of the present invention, the timing signal is an analog signal that varies in amplitude rather than frequency.

The period of a cycling timing signal can be selected to span a period of time commensurate with the period of time an average person takes to write the longest of the most common words. In another embodiment, the cycling period can be one and a half times the period of time an average person takes to write the longest of the most common words.

Figure 6:
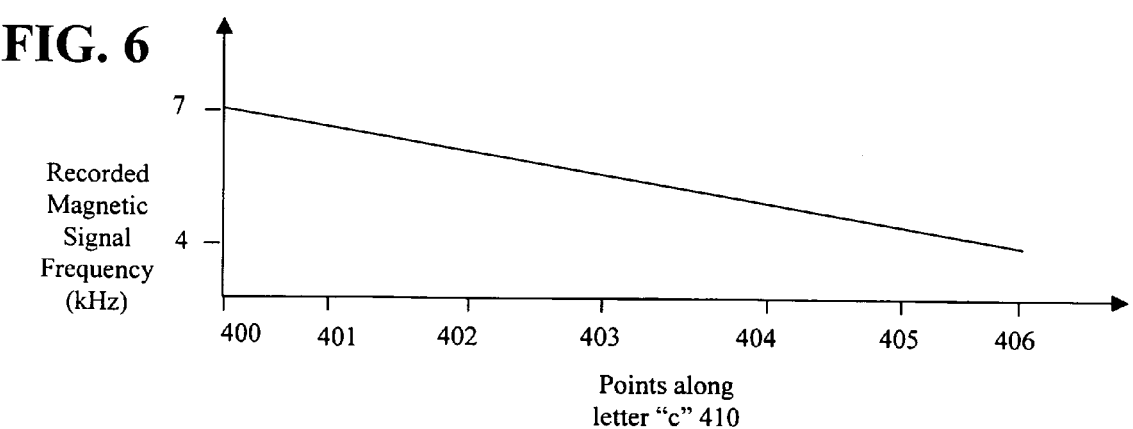
FIG. 6 illustrates a recorded magnetic signal that is stored in the magnetic ink of a handwritten character in accordance with an embodiment of the present invention.

FIG. 6 illustrates a recorded magnetic signal that is stored in the magnetic ink of a handwritten character in accordance with an embodiment of the present invention. At point 400 of letter "c" 410, the recorded magnetic signal has a frequency of 7 kHz. The recorded magnetic signal frequency decreases 0.5 kHz per 100 msecs. from point 400 of letter "c" 410 to point 406, such that the recorded magnetic signal has a frequency of 3 kHz at point 406 of letter "c" 410.

Figure 7:
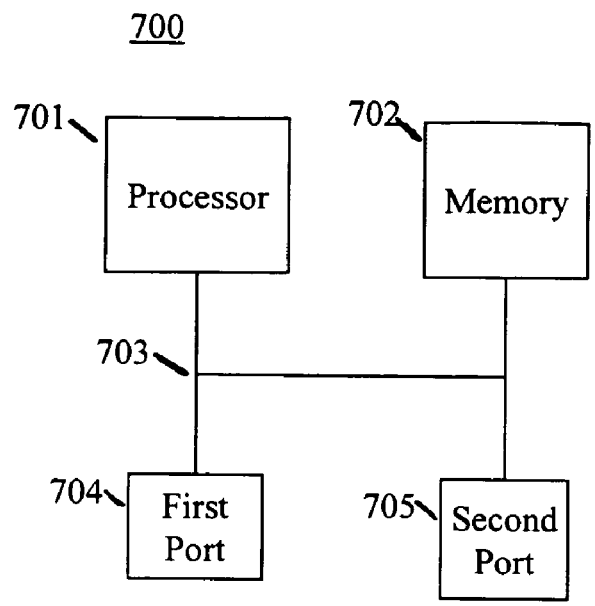
FIG. 7 shows an embodiment of encoding electronics in accordance with an embodiment of a magnetic ink encoding pen that encodes data into magnetic ink.

FIG. 7 shows an embodiment of encoding electronics in accordance with an embodiment of a magnetic ink encoding pen that encodes data into magnetic ink. Encoding electronics 700 can include a processor 701, a memory 702, a bus 703, a first port 704 adapted to be coupled to an external bus of a computer, and a second port 705 adapted to be coupled to leads coupled to magnetic ink write head 203. The processor 701 in one embodiment is a general purpose microcontroller, such as an SA-1110 microcontroller manufactured by the Intel Corporation of Santa Clara, Calif. In another embodiment, the processor 701 is an Application Specific Integrated Circuit (ASIC), which has been designed to perform in hardware and firmware at least part of a method in accordance with an embodiment of the present invention. The memory 702 is any device adapted to store digital information, such as Random Access Memory (RAM), flash memory, Read Only Memory (ROM), a combination thereof, etc. The processor 701 is coupled via the bus 703 to the memory 702 and the ports 704, 705. In one embodiment the external computer bus is a Universal Serial Bus (USB) Specification version 2.0, and the magnetic pen draws power from the USB. In another embodiment, the magnetic pen is powered by batteries, such as AAA batteries, lithium batteries, alkaline batteries, etc.

In one embodiment, a digital information signal can be generated by encoding electronics and encoded into the magnetic ink of handwritten characters to provide a timing signal in the magnetic ink that indicates the order in which pen strokes were written. A predetermined sequence of substantially different numbers (e.g., substantially different ASCII byte codes) can be stored in a memory of the encoding electronics 206. The numbers are substantially different so that errors in reading the numbers from the magnetic ink can be more readily determined. For example, errors in reading data from the magnetic ink can be caused by magnetic ink strokes that are written over by a subsequent stroke, e.g., when an "x" or "t" is written. In another embodiment, an ordinary sequence of numbers (e.g., 1, 2, 3, 4, 5, etc.) is stored. Errors in reading can be minimized by the use of error checking (e.g., a check sum, cyclic redundancy check, etc.). In one embodiment of the present invention, the timing signal includes byte codes written at 7 kHz with a standard bias signal.

Figure 8:
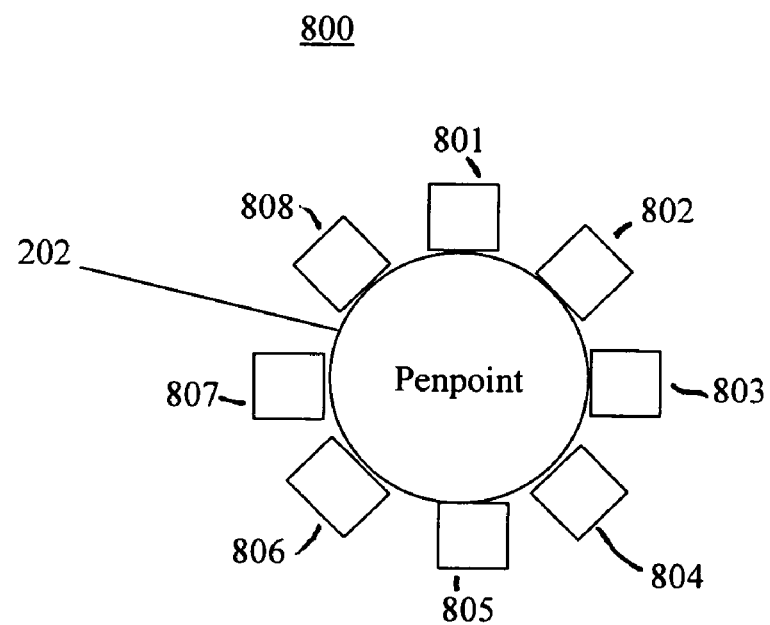
FIG. 8 shows an embodiment of a pen stroke direction sensor in accordance with an embodiment of the present invention.

FIG. 8 shows an embodiment of a pen stroke direction sensor in accordance with an embodiment of the present invention. A direction sensor 800 can be coupled to the penpoint 202 and generates a signal indicative of the direction in which the penpoint is moving across the paper. The direction sensor 80 can comprise a plurality of pressure-sensitive sensors 801–808, each of which generates a signal proportional to the amount of pressure applied to that sensor as the magnetic pen is used to write characters. Encoding electronics 206 can receive the signals from the direction sensor 800 and generate a direction signal indicative of the direction in which the magnetic pen is traveling as a character is written. The direction signal then can be stored in the handwritten magnetic ink in accordance with the present invention. In another embodiment, the direction sensor generates a direction signal which can be processed by the encoding electronics 206 or amplified and fed to the magnetic ink write head 203.

FIG. 9 shows a computer system including an embodiment of a magnetic ink encoding pen that receives data from a computer and encodes the data into magnetic ink applied to a surface. Magnetic ink encoding pen 901 receives data from computer 902 via an external bus 903 (e.g., a USB, a FireWire (IEEE 1394) bus, etc.) and encodes that data into magnetic ink as it is applied to surface 904 (e.g., of a piece of paper, a check, a transparency, a label, a sheet of plastic, etc.). As is known in the art, computer 902 includes a memory and a processor. The processor 701 in one embodiment is a general purpose microprocessor, such as a Pentium® III microprocessor manufactured by Intel Corporation. In another embodiment, the processor is an ASIC processor.

Examples of the types of data that can be encoded into the magnetic ink include security data (e.g., identification data, authentication data, a password, encrypted data, etc.), text data, numeric data, etc. In one embodiment, and as illustrated in FIG. 10, a user stores data in the magnetic ink of a straight line drawn by a magnetic pen on a piece of paper. The data can be received by the magnetic pen from the computer 902 via external bus 903. In another embodiment, user authentication data can be encoded into the magnetic ink of a user's handwriting, signature, drawn data line, etc. As illustrated in FIG. 11, authentication data can be encoded into a signature written with a magnetic ink encoding pen. In one embodiment, the magnetic ink encoding pen is powered by batteries and encoding electronics 700 store the authentication data of a particular user.

In another embodiment, the magnetic pen is powered by batteries, and data is downloaded into the pen via a wireless port (e.g., an infrared port, an RF (radio frequency) port, etc.) from a computer, a wireless network, a Personal Intelligent Device (PID) (e.g., a PalmPilot®, a Windows CE®-based handheld computer, etc.), etc. The magnetic pen can then be used to record the received data into written magnetic ink.

Figure 12:
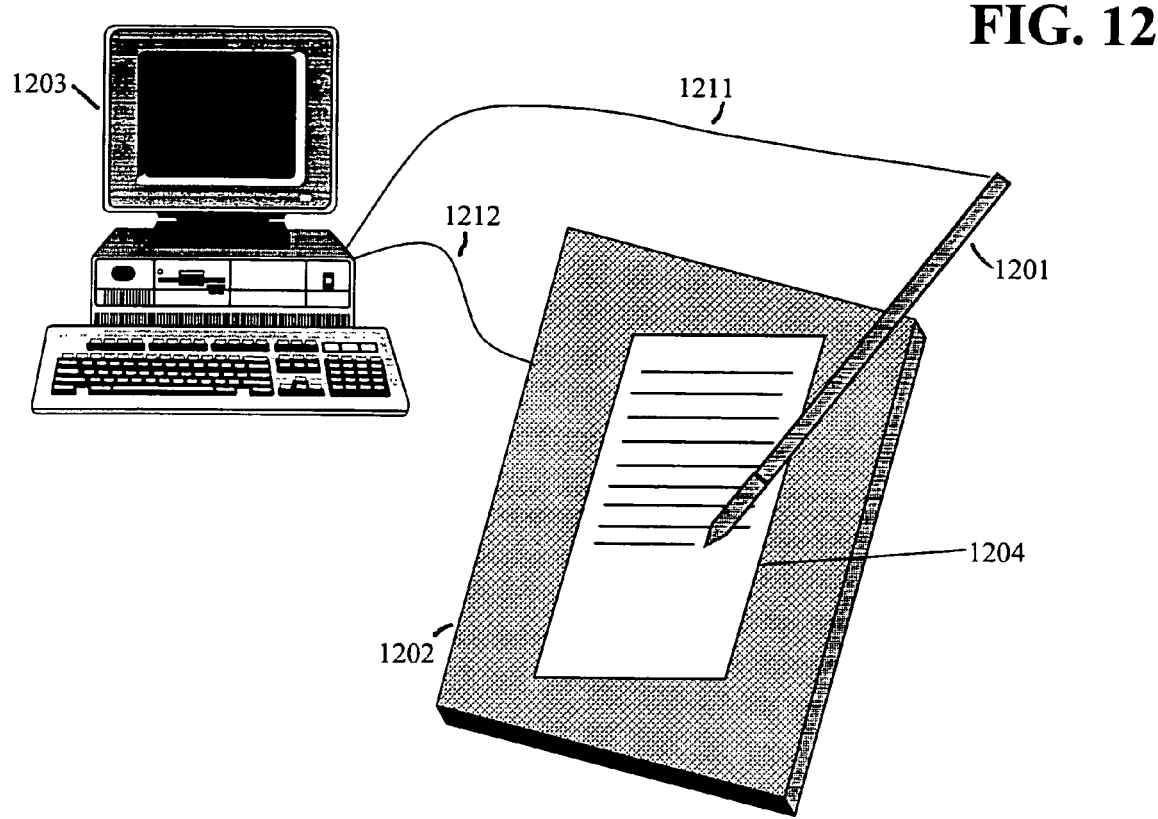
FIG. 12 shows another embodiment of a computer system in accordance with an embodiment of the present invention.

FIG. 12 shows another embodiment of a computer system in accordance with an embodiment of the present invention. A computer system can include a computer 1203 coupled to a magnetic pen 1201 via external bus connection 1211 (e.g., a USB connection). Also coupled to computer 1203 is a graphics table input device 1202 via external bus connection 1212. The computer 1203 includes and executes a dynamic handwriting recognition application (e.g., a Calligrapher® application). A user can place a piece of paper 1204 on the graphics table 1202 and write with the magnetic pen 1201 on the paper 1204. As the user writes, the graphics table 1202 senses the pen strokes and transmits dynamic pen stroke data to the dynamic handwriting recognition application running on the computer 1203. The dynamic handwriting recognition engine converts the pen stroke data into text data, and text data is transmitted to the magnetic pen 1201. The magnetic pen 1201 then stores the text data into the magnetic ink written onto the paper 1204.

Known magnetic scanners can determine the magnetic flux density of materials and can analyze manufacturing processes to determine magnetic flux strengths, leakage, etc. A magnetic scanner can perform a two-dimensional scan of a sheet of paper, which includes magnetic ink encoded with an information signal in accordance with an embodiment of the present invention, and determine the magnetic flux distribution across the sheet of paper. The information signal encoded in the magnetic ink can then be read, or disaggregated, from the magnetic flux data.

The present invention advantageously allows a magnetic ink encoding pen to store information in magnetic ink applied to a surface. A magnetic ink encoding pen can be used to encode data into the magnetic ink of written lines, handwritten characters, signatures, etc. Magnetic ink applied to a surface in accordance with embodiments of the present invention can store information signals, security data, authentication information, and other types of data.

What is claimed is:

1. A magnetic ink encoding stylus, comprising:
   a penpoint to apply magnetic ink to a surface; and
   a magnetic ink write head, coupled above the penpoint relative to the surface and to apply a varying magnetic flux to the magnetic ink from a reservoir as it is applied by the penpoint to the surface, said write head including a magnetic coil surrounding a magnetically permeable core such that said reservoir passes through said core and said magnetic coil is to apply the varying magnetic flux to the magnetic ink to store information in said magnetic ink as it is applied to the surface.

2. The apparatus of claim 1, wherein the magnetic coil is a wire coil.

3. The apparatus of claim 1, wherein the magnetic ink write head includes a plurality of magnetic pole faces.

4. The apparatus of claim 1, further comprising a signal generator coupled to the magnetic ink write head.

5. The apparatus of claim 4, wherein the signal generator includes an analog timing signal generator.

6. The apparatus of claim 4, wherein the signal generator includes a digital signal generator.

7. The apparatus of claim 4, further comprising a pressure sensor coupled to the signal generator.

8. The apparatus of claim 1, further comprising encoding electronics coupled to the magnetic ink write head.

9. The apparatus of claim 8, further comprising a direction sensor coupled to the encoding electronics.

10. The apparatus of claim 1, further comprising a port adapted to be coupled to an external computer bus, said port coupled to the magnetic ink write head.

11. A magnetic ink encoding stylus, comprising:
    a penpoint to apply magnetic ink from a reservoir to a surface; and
    a magnetic ink write head, coupled to the penpoint and adapted to apply a varying magnetic flux to the magnetic ink as it is applied by the penpoint to the surface wherein the magnetic ink write head includes:
        a magnetic field generator coupled above the penpoint relative to the surface, said magnetic field generator including a magnetic coil surrounding a magnetically permeable core such that said reservoir passes through said core and said magnetic coil is to apply the varying magnetic flux to the magnetic ink to store information in said magnetic ink as it is applied to the surface, and
        a magnetic shield coupled over said magnetic field generator.

12. The apparatus of claim 11, further comprising a magnetic field director.

13. The apparatus of claim 12, wherein the magnetic field director includes an iron core element.

14. A computer system, comprising:
    a computer, including
        a processor;
        a memory coupled to the processor; and
        an external bus coupled to the processor; and
    a magnetic ink encoding stylus, including
        a penpoint to apply magnetic ink from a reservoir to a surface;
        a magnetic ink write head coupled above the penpoint relative to the surface and to apply a varying magnetic flux to the magnetic ink as it is applied by the penpoint to the surface, said write head including a magnetic coil surrounding a magnetically permeable core such that said reservoir passes through said core and said magnetic coil is to apply the varying magnetic flux to the magnetic ink to store information in said magnetic ink as it is applied to the surface; and
        a port coupled to the magnetic ink write head and to the external bus.

15. The computer system of claim 14, wherein the magnetic ink encoding stylus includes a signal generator.

16. The computer system of claim 14, wherein the magnetic ink encoding stylus includes encoding electronics.

17. The computer system of claim 14, wherein the computer includes:
    a graphics tablet coupled to the processor; and
    a handwriting recognition application coupled to the processor.

18. A method of storing information, comprising:
    applying magnetic ink on a surface through a reservoir and a pen point of stylus; and
    applying a varying magnetic flux to the magnetic ink via a magnetic coil surrounding a magnetically permeable core such that said reservoir passes through said core and applying the varying magnetic flux to the magnetic ink is to store information in said magnetic ink as it is applied to the surface.

19. The method of claim 18, wherein the information is digital information signal.

20. The method of claim 18, wherein the information is security data.

21. The method of claim 18, wherein applying a varying magnetic flux to the applied magnetic ink includes:
generating a varying magnetic field corresponding to an information signal, the varying magnetic field intersecting the applied magnetic ink.

22. The method of claim 21, further comprising:
responsive to sensing stylus pressure, generating the information signal.

23. The method of claim 21, wherein the information signal is a timing signal.

24. The method of claim 21, wherein the information signal is received from a computer.

* * * * *